United States Patent
Schieren

(10) Patent No.: US 8,992,117 B2
(45) Date of Patent: Mar. 31, 2015

(54) FORMFITTING CONNECTION WITH BREAK-AWAY FUNCTION IN ONE DIRECTION BETWEEN TWO COMPONENTS

(71) Applicant: Ski Data AG, Grödig/Salzburg (AT)

(72) Inventor: Jürgen Schieren, Munich (DE)

(73) Assignee: Ski Data AG, Groedig/Salzburg (AT)

( * ) Notice: Subject to any disclaimer, the term of this patent is extended or adjusted under 35 U.S.C. 154(b) by 0 days.

(21) Appl. No.: 14/019,806

(22) Filed: Sep. 6, 2013

(65) Prior Publication Data

US 2014/0147202 A1 May 29, 2014

(30) Foreign Application Priority Data

Nov. 26, 2012 (EP) ..................... 12194220

(51) Int. Cl.
  *E01F 9/018* (2006.01)
  *E01F 13/06* (2006.01)
  *F16B 31/06* (2006.01)
  *F16B 31/02* (2006.01)

(52) U.S. Cl.
  CPC ............. *E01F 13/06* (2013.01); *F16B 31/06* (2013.01); *F16B 31/021* (2013.01)
  USPC .............................. 404/10; 403/2

(58) Field of Classification Search
  USPC .......... 40/607.11, 612; 404/9, 10; 49/49, 232; 403/2
  IPC ............................ E01F 9/018, 9/0186
  See application file for complete search history.

(56) References Cited

U.S. PATENT DOCUMENTS

| | | | |
|---|---|---|---|
| 3,602,057 A | 8/1971 | McEntire | |
| 4,030,745 A | 6/1977 | Schoeffler et al. | |
| 4,729,690 A * | 3/1988 | Lavender et al. | 404/10 |
| 5,354,144 A * | 10/1994 | Lizakowski | 404/10 |
| 5,503,496 A * | 4/1996 | Voigt | 404/10 |
| 5,884,432 A * | 3/1999 | DeLillo | 49/49 |
| 8,181,392 B1 * | 5/2012 | Farber | 49/49 |
| 8,444,343 B2 * | 5/2013 | McCue et al. | 404/9 |
| 2002/0152683 A1 | 10/2002 | Burnette et al. | |
| 2007/0199243 A1 | 8/2007 | Youn | |
| 2013/0022396 A1 * | 1/2013 | Hannah et al. | 404/10 |

FOREIGN PATENT DOCUMENTS

| | | |
|---|---|---|
| DE | 202011109975 U1 | 9/2012 |
| EP | 2085631 A1 | 8/2009 |
| GB | 1145552 A | 3/1969 |
| JP | 11020700 | 1/1999 |

* cited by examiner

*Primary Examiner* — Gary Hartmann
(74) *Attorney, Agent, or Firm* — Karl F. Milde, Jr.; Eckert Seamans Cherin & Mellott, LLC

(57) ABSTRACT

A form-fitting connection between two components (5 and 14) has a break-away function in one direction. At least one connection element, designed as a shear bolt (6), is formfittingly connected to the first component (5) to be connected. The end of the shear bolt (6) is formfittingly and functionally connected to a second component (14) via an attached component (17) that is resilient in the direction of the formfitting connection.

8 Claims, 5 Drawing Sheets

FORMFITTING CONNECTION WITH BREAK-AWAY FUNCTION IN ONE DIRECTION BETWEEN TWO COMPONENTS

BACKGROUND OF THE INVENTION

The present, invention relates to a formfitting connection with break-away function in one direction between two components, for example for use with a movable barrier arm for controlling the passage of motor vehicles. In particular, the invention relates to a formfitting connection between a barrier arm of a vehicle barrier arranged along a defined length in a receptacle of a barrier head disk. When assembled, the barrier head disk may be connected directly, or rotationally through a gearbox, to a rotatable shaft on the barrier head of a harrier column of the vehicle barrier, along an axis perpendicular to the pivot axis of the barrier arm, and in the direction facing away from the barrier head disk.

It is known in the art to formfittingly connect the barrier arm of a vehicle barrier to a barrier head disk which, in turn, is connected directly or is rotationally fixed to a barrier arm shaft of a vehicle barrier. For this purpose the barrier arm is arranged in a longitudinal receptacle of the barrier head disk that establishes a formfitting, rotationally fixed connection between the barrier head dish and the barrier arm in the pivot direction of the barrier arm.

Friction-locked connection elements with a break-away function are typically used in order to implement the connection of the barrier arm disk to the barrier arm in a direction parallel to the pivot axis of the barrier arm. Preferably the friction-locked connection elements are designed as break-away screws, which break off upon application of a force component perpendicular to the pivot direction of the barrier arm when the force component exceeds a specified value, thus enabling the barrier arm to drop with the aim of avoiding damage to the barrier arm and to the vehicle.

However this arrangement has the disadvantage that the break-away screws must be screwed in, or tightened, as much as possible during assembly of the vehicle barrier such that the break-away screws are already heavily prestressed in the assembled state of the vehicle barrier. This entails risk that the formfitting connection in the direction perpendicular to the pivot axis of the barrier arm may loosen from an applied low force in a direction facing away from the barrier head disk, which leads to interference with the operation of the vehicle barrier. In the reverse case, when the screws are insufficiently tightened, mounting of the arm is not robust. In the end, the required moments for breaking the screws are within too wide a tolerance range so there is a risk that, the break-away function becomes unreliable.

SUMMARY OF THE INVENTION

The objective of the present invention is to provide a form-fitting connection with a break-away function in one direction between two components that avoids prestressing the connection elements that serve both the formfitting connection and the break-away function. In addition, the formfitting connection should be restorable quickly, easily and cost-effectively after the connection has bean broken.

In case of a formfitting connection between a barrier arm of a vehicle barrier arranged along a defined length in a receptacle of a barrier head disk and the barrier head disk, it is necessary in some countries for a component to fee physically damaged during break-away in order to legally charge the person who caused the break-away of the barrier arm. In addition, the relative cost for fixed mounted components and for the replaceable breakable components plays a decisive role. Since broken components must be changed or replaced on site while the parking lot is in operation, this repair must, be accomplished quickly and easily.

According to the present invention, there is provided a formfitting connection with a break-away function in one direction between two components, the connection having at least one connection element designed as a shear bolt, which is formfittingly connected to the first component to be connected. The end of the shear bolt is formfittingly and functionally connected to the second component to be connected, in the direction of the formfitting connection to be established, via a component that is designed elastically in the direction of the formfitting connection and is connected to the second component to be connected.

Here, at least one shear bolt is in a locking position when the formfitting connection to the first component to be connected is in place. Upon establishing the formfitting functional connection between the shear bolt and the second component to be connected, the shear bolt is held securely in the locking position through the force of the elastically designed component.

The elastically designed component can be in the form of a leaf spring, a central spring or an elastomer.

In the case of the formfitting connection of a barrier arm arranged along a defined length in a receptacle of a barrier head disk to the barrier head disk along an axis perpendicular to the pivot axis of the barrier aim in the assembled state, and in the direction facing away from the barrier head disk, the shear bolt(s) is/are preferably either directly and formfittingly connected to the barrier arm or formfittingly connected to a component that encloses the barrier arm along a defined length along the longitudinal axis. Alternatively, the shear bolt or bolts can be connected formfittingly to the barrier head disk, wherein the elastically designed component is connected to the barrier arm or to the component enclosing the barrier arm along a defined length along the longitudinal axis, respectively.

Preferably, the formfitting connection between the shear bolt and the first component to be connected is carried out such that the shear bolt is in a locking position when the formfitting connection to the first component to be connected is in place. Upon establishing the formfitting functional connection between the shear bolt and the second component to be connected, the shear bolt is held securely in the locking position via the elastically designed component through the force of the elastically designed component.

In the assembled state, the shear bolt protrudes from the first component to be connected. The formfitting functional connection is established via the end of the shear bolt in the desired direction to the second component to be connected. The predetermined breakaway point of the shear bolt is provided past the last contact point with the first component to be connected, when viewed axially after the connection has been established.

Due to the fact that the shear bolt in the assembled state is formfittingly and functionally connected to the second element to be connected in the desired direction via the elastically designed component, the elastically designed component constitutes a force-limiting element in the direction of the predetermined breakaway point.

According to one preferred embodiment of the invention, the shear bolt has a T-shaped head that is suited to formfittingly interact with the first component to be connected. At least one end of the bolt head has a shaped element for a formfitting connection to a tool for rotating the shear bolt in a direction perpendicular to the longitudinal axis of the bolt head.

To establish the formfitting connection of the shear bolt to the first element to be connected, the shear bolt is inserted with one end of its head in front into the receptacle of the first component to be connected. Thereafter, the shear bolt is rotated around the longitudinal axis of the bolt head by means of a tool in order to move the shear bolt into the locking position. Preferably in doing so the bolt is rotated along a helical line or a ramp, respectively, into the locking position. The helical line is designed such that during the rotation of the shear bolt, the elastically designed component is pretensioned an the force increases such that the shear bolt is held securely in the looking position.

The invention is described in greater detail below using the example of a formfitting connection between a barrier am of a vehicle barrier arranged along a defined length of a receptacle of a barrier head disk with the barrier head disk arranged along an axis perpendicular to the pivot axis of the barrier arm in the assembled state and in the direction facing away from the barrier head disk.

For a full understanding of the present invention, reference should now be made to the following detailed description of the preferred embodiments of the invention as illustrated in the accompanying drawings.

BRIEF DESCRIPTION OF THE DRAWINGS

FIG. 8 is a detailed view of section B from FIG. 7.

DESCRIPTION OF THE PREFERRED EMBODIMENTS

Figure 1:
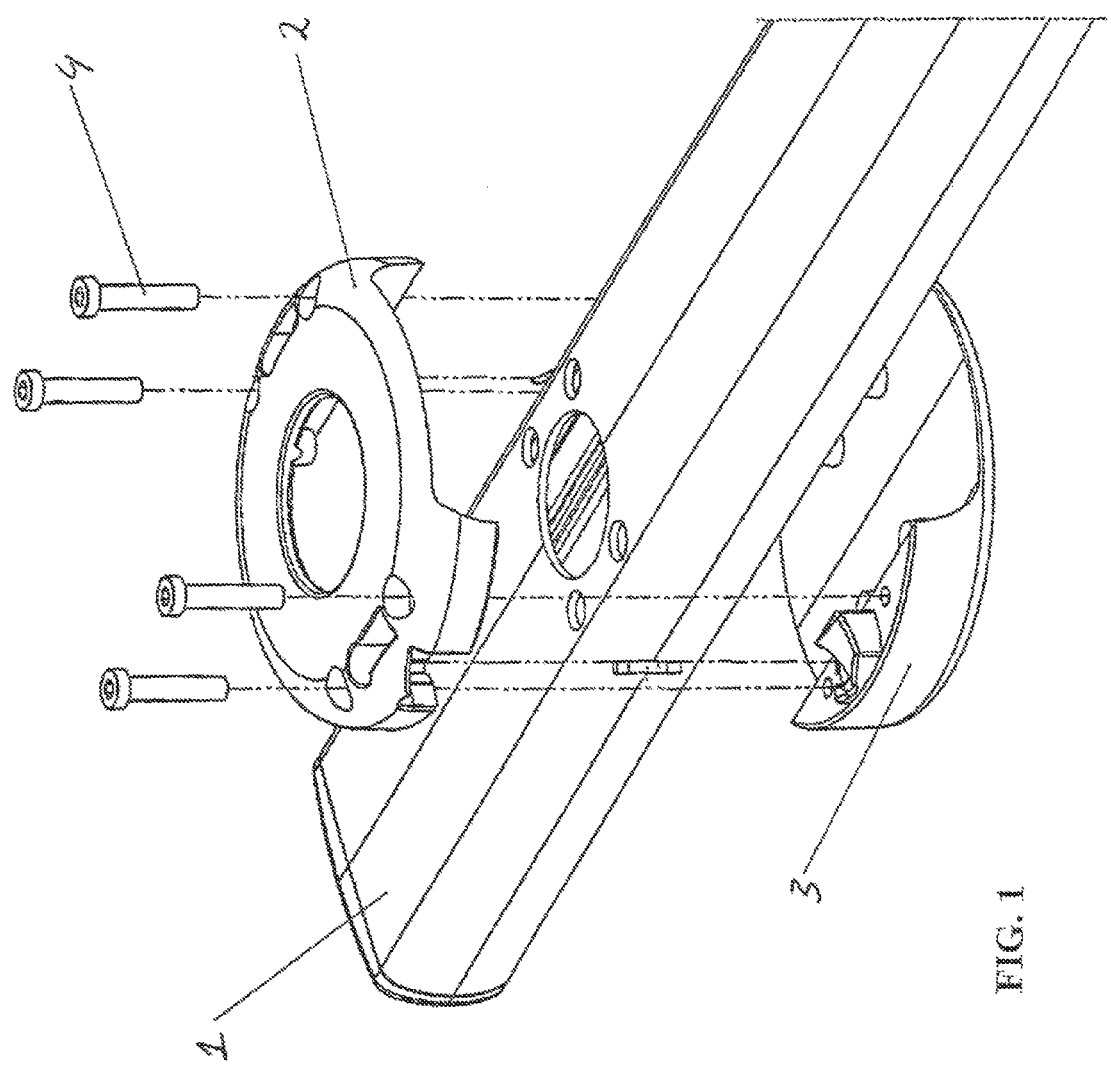
FIG. 1 is an exploded view of a portion of a barrier arm and of a component enclosing the barrier arm along a defined length along the longitudinal axis, this component being formed of two half disks and forming a first component to be connected.

The preferred embodiments of the present invention will now be described with reference to FIGS. 1-8 of the drawings. Identical elements in the various figures are designated with the same reference numerals.

Figure 2:
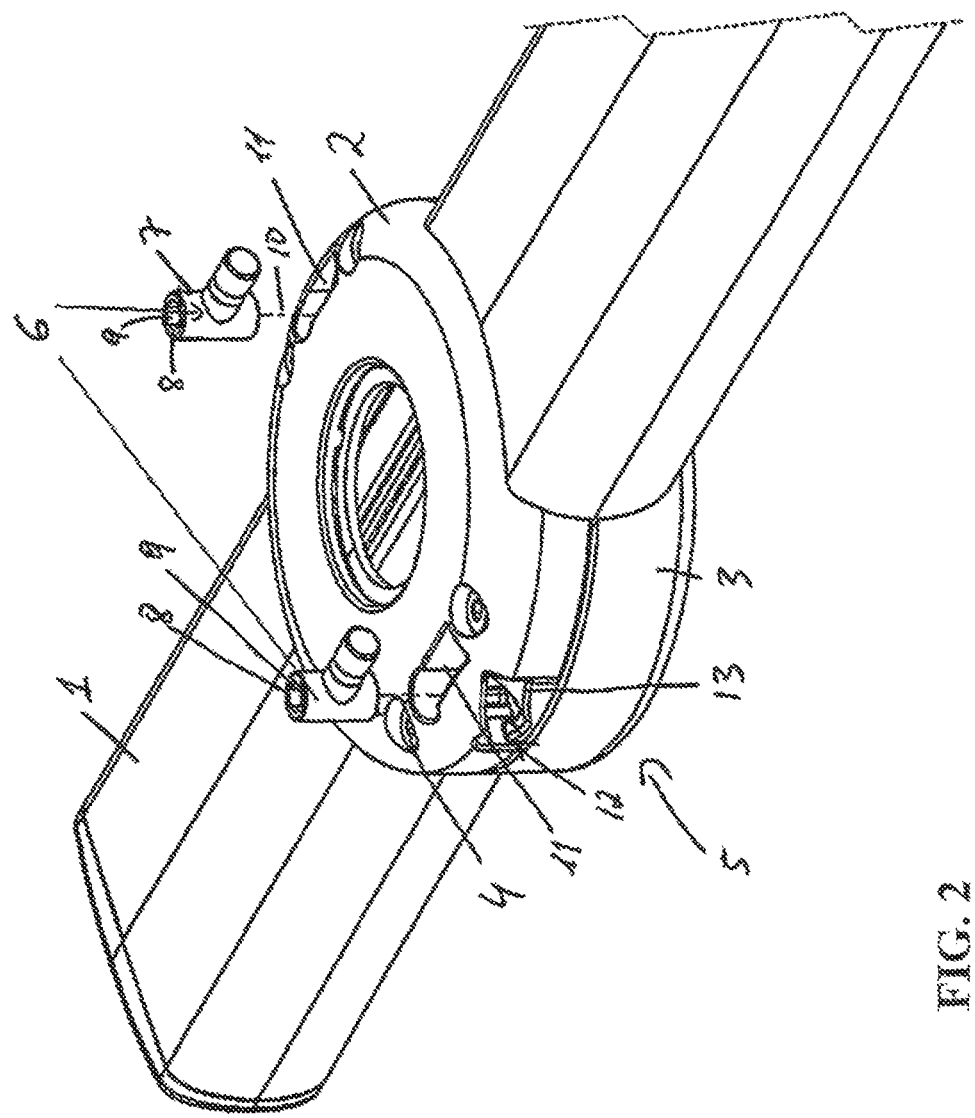
FIG. 2 is a perspective view of the portion of the barrier arm shown in FIG. 1, showing the first component connected to the barrier arm as well as shear bolts according to the invention.

FIG. 1 shows the end of a barrier arm that faces toward the barrier column of a vehicle barrier. Also shown are two half disks 2, 3, which are connected to each other using fastening means such as screws 4 snob that they enclose the barrier arm 1 along a defined length along its longitudinal axis. The component 5 consisting of the two half disks 2, 3 forms the first component to be connected in terms of the invention and is shown in FIG. 2. The two half disks 2, 3 are preferably made by casting or injection molding. In the shown example, the upper half disk 2 is the half disk that faces the barrier head disk after assembly.

According to the invention, the formfitting connection with a break-away function between two components in one direction has at least one connection element designed as a shear bolt. This connection element is formfittingly connected to the first component to be connected. The end of the shear bolt is formfittingly and functionally connected to the second component to be connected in the direction of the formfitting connection that is to be established, by means of a component that is designed elastically in the direction of the formfitting connection to be established and is connected to the second component to be connected.

In the example shown, the first component to be connected is the component 5 that consists of the two half disks 2, 3 and, in turn, is connected to the barrier arm 1. The inventive formfitting connection is a connection of the first component 5 to be connected to a barrier head disk constituting the second component to be connected along an axis perpendicular to the pivot axis of the barrier arm in the assembled state and in the direction facing away from the barrier head disk. The barrier head disk is connected in the area of the barrier head of a barrier column of a vehicle barrier, directly or rotationally fixed via a gear box to the powered barrier arm shaft. The required shear bolts are shown in FIG. 2, indicated by the reference numeral 6. In the assembled state which is illustrated in FIG. 2, the two half disks 2, 3 form two receptacles 11 arranged diametrically opposite each other and provide helical lines or ramps 13, respectively, for receiving a shear bolt 6 each.

With reference to FIG. 2, the two required shear bolts 6 have a T-shaped bolt head 7, which is suited for the formfitting interaction with the first component 5 to be connected. In addition, at least one end 8 of the bolt head 7 has a formed element 9 for the formfitting connection to a tool, for example an Allen wrench or a screwdriver for rotating the shear bolt in the direction perpendicular to the longitudinal axis 10 of the bolt head 7.

With this design, the material selection for the shear bolts 6 plays a central role because the breaking strength of the material, the breaking behavior (brittle fracture after exceeding a force potentially defined by a predetermined breakaway point rather than ductile fracture after greater plastic deformation) and the capability for exterior application in all climatic zones for many years without significant changes to the properties is of particular significance.

The required force for the breakaway of the shear bolts 6 must be within the window between an attack on the barrier arm by heavy winds, where they must not yet break, and the required force for the breakaway of the barrier arm to which a certain secure distance must be maintained.

Furthermore, the compressive strength of the material must allow for the transfer of force to tension the spring using a tool without having the formed element 9 rendered unusable through deformation by interacting with a tool.

For these reasons, the shear bolts 6 are preferably made of polyamide (PA) with a fiberglass component and/or a carbon fiber component or of polyarylamide (PARA) with a fiberglass component and/or a carbon fiber component or of polyphenylene sulfide (PPS) with a fiberglass component and/or a carbon fiber component or of styrene acrylnitrile (SAN) with a fiberglass component and/or a carbon fiber component.

Here, the formfitting connection of the shear bolts 6 to the first component 5 to be connected is established such that the shear bolts 6 are inserted with one end of the bolt head 7 in the front into a receptacle 11 of the first component 5 to be connected; thereafter, the shear bolts 6 are rotated using a tool, for example an Allan wrench, around the longitudinal axis 10 of the bolt head 7, in order to move each of the shear bolts into a locking position 12.

Preferably, the shear bolts 6 are rotated along a helical line 13 or a ramp, respectively, into the locking position 12. The helical line is designed such that during the rotation of a shear bolt 6, the elastically designed element that is connected to the second component is pretensioned with an increasing force by the shear bolt 6 such that the shear bolt 8 can be held securely in the locking position 12 after the formfitting functional connection has been established.

Figure 3B:
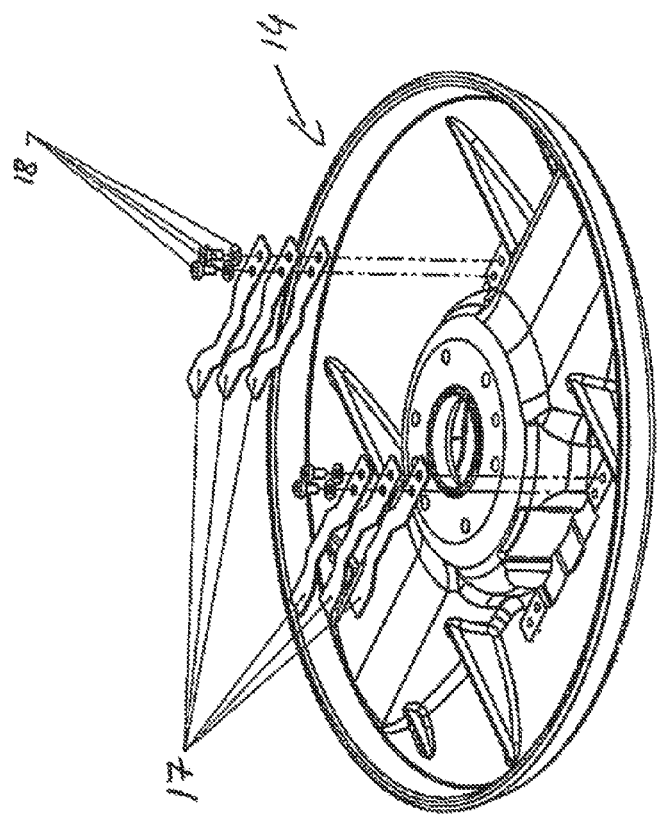
FIGS. 3A and 3B are perspective views of the front and rear sides of the barrier arm disk that is to be connected to the barrier arm.
Figure 3A:
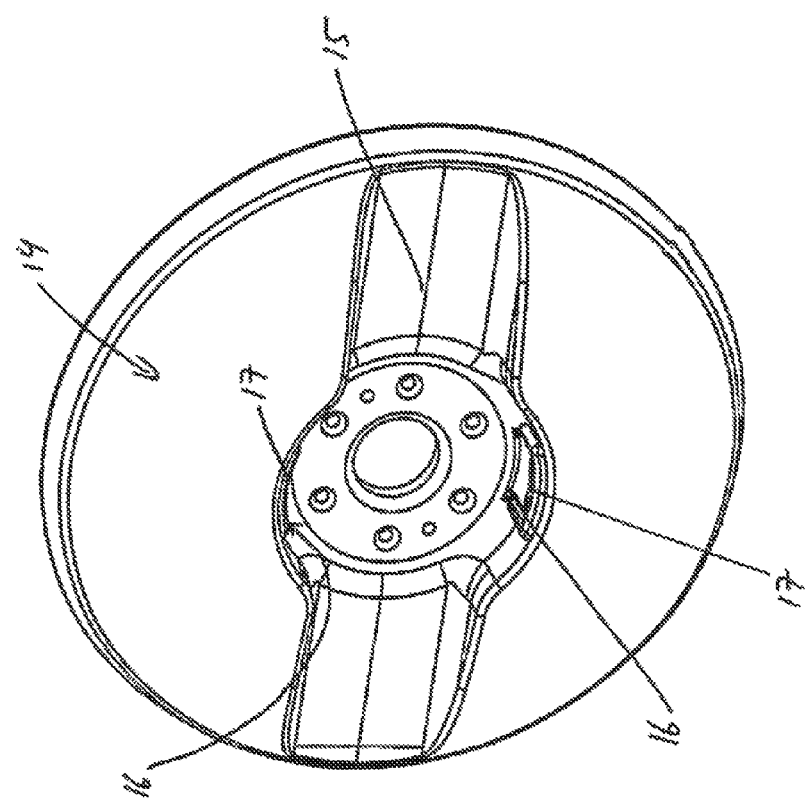

The barrier head disk 14 is shown in FIGS. 3A and 3B. At its front side, shown in FIG. 3A, it comprises a receptacle 15 for formfittingly receiving the barrier arm 1 that is connected to the first component 5 in the pivot direction of the barrier arm 1 in the assembled state. In addition, the barrier head disk 14 has one receptacle 16 each at the locations opposite to the locking position 12 of the shear bolts 6 after formfittingly receiving the portion of the barrier arm 1 that is connected to the first component 5. In each of the receptacles 16 is/are arranged one or more leaf springs 17, through which the formfitting functional connection is established along an axis perpendicular to the pivot axis of the barrier arm in the assembled state and in the direction that faces away from the barrier head dish between a shear bolt 6 and the barrier head disk 14.

In the example shown, the leaf springs 17 are held together, attached to the barrier head dish 14 by means of screws 18, as shown in FIG. 3B.

Figure 4:
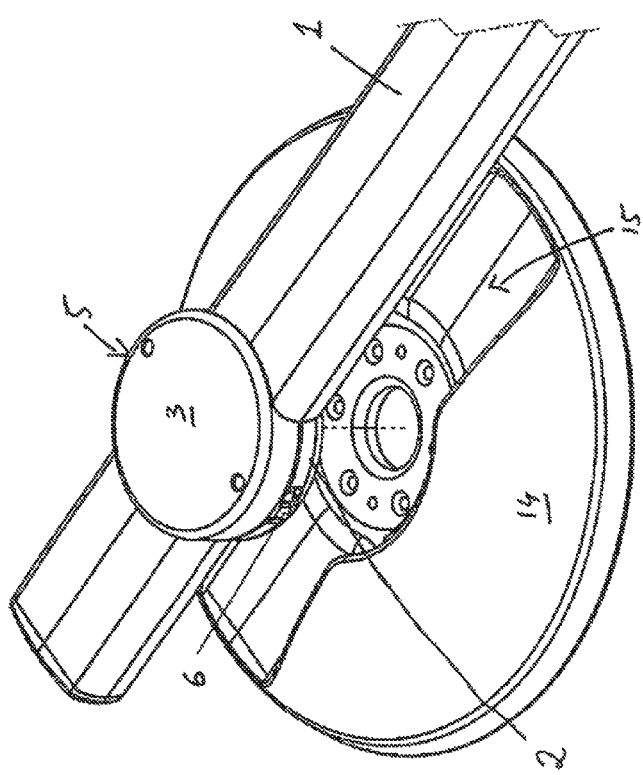
FIG. 4 is a perspective view of the barrier arm disk and of the portion of the barrier arm shown in FIG. 2 prior to assembly.

FIG. 4 shows the barrier arm disk 14 and the end of the barrier arm 1 that is connected to the first component 5, facing toward the barrier column of a vehicle barrier prior to assembly. As shown in FIG. 2, the shear bolts 6 are inserted, with one of the ends of the bolt head 7 in front, into the receptacle 11 of the first component 3 that is to be connected. The receptacles 11 are not shown in FIG. 4 because they are formed by the half dish 2 that faces the barrier head disk 14. The half disk 3 that faces away from the barrier head disk 14 has two bore holes 8 (FIG. 5) through which the shear bolts 8 can be rotated around the longitudinal axis 10 of the bolt head 7 using an Allen wrench.

Figure 5:
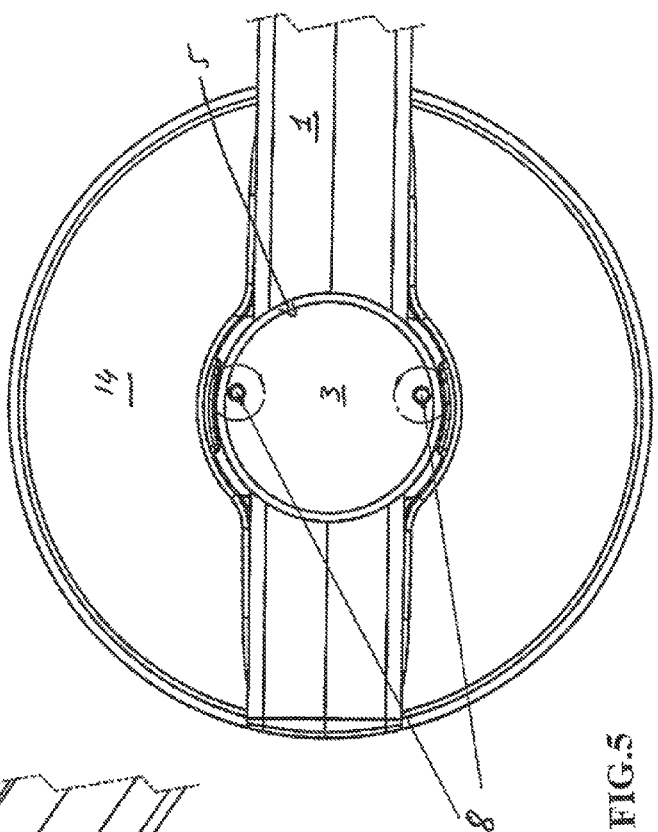
FIG. 5 is a top view of the front side of the barrier arm disk and of the portion of the barrier arm shown in FIG. 2 in the assembled state.

In a next, step, which is the subject of FIG. 5, the part of the barrier arm 1 that is connected to the first component 5 is arranged in the receptacle of the barrier head disk 14 that is provided for this purpose, thus implementing a formfitting connection between the barrier arm 1 and the barrier head disk 14 in the pivot direction of the harrier arm 1 as well as along an axis perpendicular to the pivot axis of the barrier arm and in the direction facing the barrier head disk 14.

Figure 7:
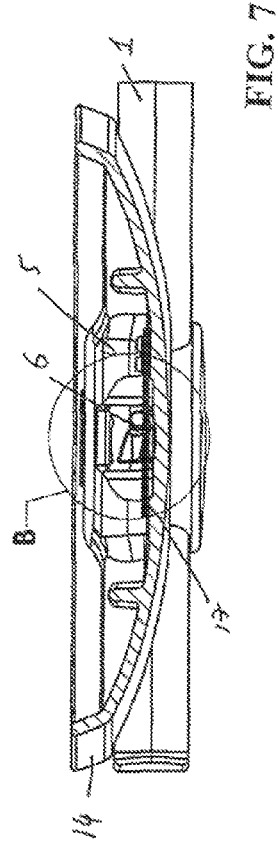
FIG. 7 is a sectional view along the line A-A in FIG. 6.
Figure 6:
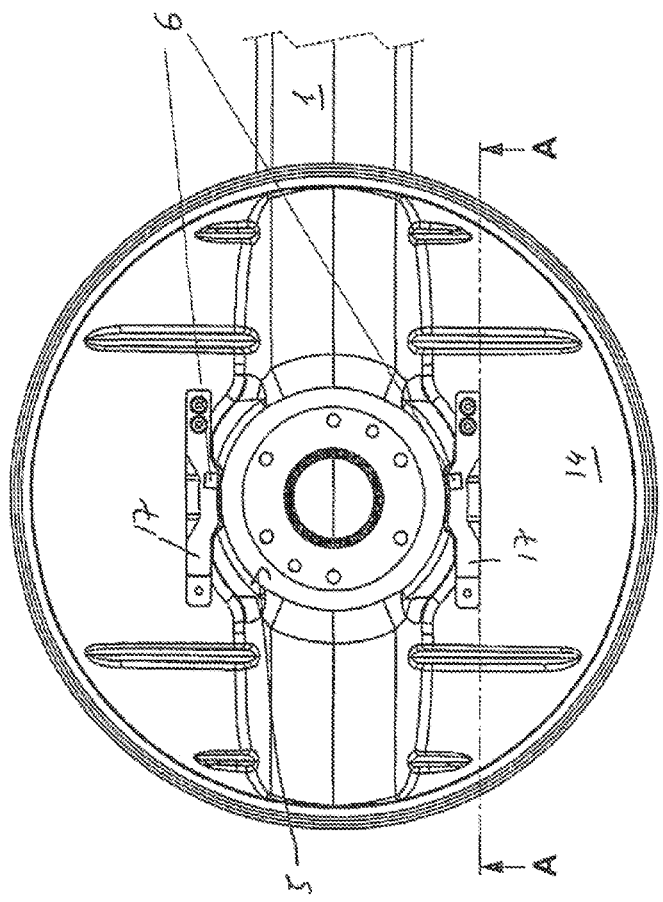

Thereafter and with reference to FIG. 6, the shear bolts 6 are rotated around the longitudinal axis 10 of their bolt heads 7 using an Allen wrench wherein, as has already been explained, the rotation of the shear bolts 6 occurs along a helical line until the locking position is reached, which is the case when a further rotation is no longer possible. In the locking position, the shear bolts protrude from the first component 5. According to the invention, the helical line is designed such that a leaf spring 17, that is connected to the barrier head disk 14, is pretensioned by the shear bolt 6 as the force increases daring the rotation of the shear bolt 6. The shear bolt 6 is thus held securely in the locking position 12. At the same time, by using the shear bolts 6, a formfitting functional connection is established between the first component 5 and the barrier head disk 14 along an axis perpendicular to the pivot axis of the barrier arm 1 and in the direction facing away from the barrier head disk, as is illustrated in FIGS. 6 and 7.

Figure 8:
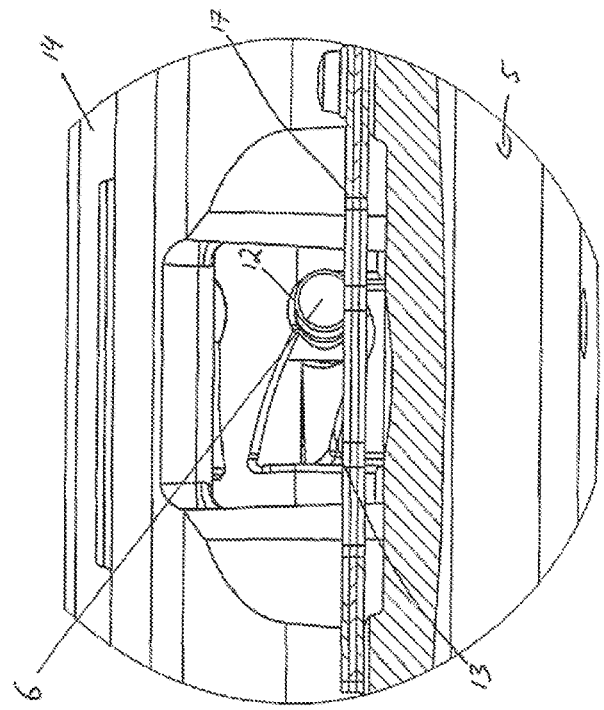
FIG. 8 is a top view of the rear side of the barrier arm disk and of the portion of the barrier arm shown in FIG. 2 in the assembled state.

The leaf spring 17 is shown in the not deformed state in the detailed view according to FIG. 8.

In the context of another embodiment (not shown), the shear bolts can be formfittingly connected to the barrier head disk (in this case, the receptacle for the shear bolts as well as the helical line are provided in the barrier head disk), wherein the leaf springs that are facing the shear bolts are arranged on the component that comprises the two half disks and is connected to the barrier arm.

Furthermore, the component consisting of the two half disks can be omitted and, for the case that the shear bolts are formfittingly connected to the barrier arm, the receptacles and the helical lines for the shear bolts are preferably realised by milling. In case the shear bolts are formfittingly connected to the barrier arm disk, the receptacles for arranging the leaf springs, which are required at the barrier arm, can be realized by milling as well.

There has thus been shown and described a novel formfitting connection between two components, with a break-away function in one direction, which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A formfitting connection with a break-away function in one direction between two components, said formfitting connection comprising a first component and a second component connected together; at least one shear bolt formfittingly connected to the first component, with an end of the shear bolt being formfittingly and functionally connected to the second component in the direction of the formfitting connection; and at least one elastic component connected to the second component which is resilient in the direction of the formfitting connection and configured to apply a force to the shear bolt;

wherein the shear bolt has a bolt head configured for insertion into a receptacle of the first component, the bolt head being rotatable by means of a tool around a longitudinal axis to move the shear bolt into a locking position;

wherein the bolt head is T-shaped and configured to interact formfittingly with the first component, and wherein at least one end of the bolt head has a formed element for formfittingly connecting to the tool for rotating the shear bolt in a direction perpendicular to the longitudinal axis of the bolt head; and wherein the shear bolt is rotatable along a helical line or a ramp in the first component to the locking position, the helical line or ramp being configured to pretension the elastic component during the rotation of the shear bolt with an increasing force such that the shear bolt is held securely in the locking position.

2. Formfitting connection with a break-away function in one direction between two components as defined in claim 1, wherein, when in the established formfitting connection, the shear bolt is held in a locking position with the first component by the force of the elastic component.

3. Formfitting connection with a break-away function in one direction between two components as defined in claim 1, wherein the elastic component is selected from the group consisting of a leaf spring, a central spring and an elastomer.

4. Formfitting connection with a break-away function in one direction between two components as defined in claim 1, wherein the shear bolt is configured to have a predetermined breakaway point after a last contact point with the first component, as viewed axially.

5. Formfitting connection with a break-away function in one direction between two components as defined in claim 1, wherein the shear bolt is made of a material selected from the group consisting of a polyamide (PA) with a fiberglass component; PA with a carbon fiber component; a polyarylamide (PARA) with a fiberglass component; PAPA with a carbon fiber component; a polyphenylene sulfide (PPS) with a fiberglass component; PPS with a carbon fiber component; styrene acrylnitrile (SAN) with a fiberglass component and SAN with a carbon fiber component.

6. A vehicle barrier having a barrier arm with a formfitting connection with a break-away function in one direction between two components, said formfitting connection comprising a first component and a second component connected together; at least one shear bolt formfittingly connected to the first component, with an end of the shear bolt being formfittingly and functionally connected to the second component in the direction of the formfitting connection; and at least one elastic component connected to the second component which is resilient in the direction of the formfitting connection and configured to apply a force to the shear bolt, a barrier arm of the vehicle barrier being arranged along a defined length in a receptacle of a barrier head disk which is mechanically coupled to a barrier arm shaft on a barrier head of a barrier column of the vehicle barrier, along an axis perpendicular to a pivot axis of the barrier arm and in a direction facing away from the barrier head disk, wherein the first component forms a part of the barrier arm and the second component is the barrier head disk.

7. A vehicle barrier having a barrier arm with a formfitting break-away connection in one direction between two components as defined in claim 6, wherein the component that encloses the barrier arm along a defined length along the longitudinal axis comprises two half disks that are connected to each other and form the first component when in the assembled state, said two half disks forming two receptacles arranged diametrically opposite each other and providing a helical line or a ramp for receiving one shear bolt each, wherein the barrier head disk forms the second component and wherein each receptacle has a resilient component arranged therein, providing the formfitting functional connection between the shear bolt and the barrier head disk.

8. A vehicle barrier having a barrier arm with a formfitting break-away connection in one direction between two components as defined in claim 7, wherein the two half disks are formed by a casting.

* * * * *